(12) United States Patent
Klein et al.

(10) Patent No.: US 9,931,701 B1
(45) Date of Patent: Apr. 3, 2018

(54) HAND TOOL SUPPORT DEVICE AND METHOD

(71) Applicant: The Boeing Company, Chicago, IL (US)

(72) Inventors: Andrew A. Klein, Arlington, WA (US); Khiem N. Pham, Everett, WA (US); David Trepanier, Mill Creek, WA (US); John A. Lepore, St. Charles, MO (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 15/408,395

(22) Filed: Jan. 17, 2017

(51) Int. Cl.
| | |
|---|---|
| B23B 45/00 | (2006.01) |
| B25H 1/00 | (2006.01) |
| F16M 13/04 | (2006.01) |
| B25F 5/00 | (2006.01) |
| B25F 5/02 | (2006.01) |

(52) U.S. Cl.
CPC .......... B23B 45/001 (2013.01); B25F 5/006 (2013.01); B25F 5/021 (2013.01); B25F 5/026 (2013.01); B25H 1/0021 (2013.01); F16M 13/04 (2013.01)

(58) Field of Classification Search
CPC .......... B25F 5/021; B25F 5/026; B25F 5/006; B23B 45/001; B25H 1/0021
USPC ........... 16/431, 430, 426; 173/170; 224/267; 294/25
See application file for complete search history.

(56) References Cited

U.S. PATENT DOCUMENTS

| | | | | |
|---|---|---|---|---|
| 2,504,880 A | * | 4/1950 | Rittenhouse | B25F 3/00 144/104 |
| 4,924,571 A | * | 5/1990 | Albertson | A01G 3/08 224/222 |
| 4,924,924 A | * | 5/1990 | Stewart | B27C 7/06 142/36 |
| 5,031,323 A | * | 7/1991 | Honsa | B25F 5/021 30/276 |
| 5,156,429 A | * | 10/1992 | Adams | B25F 5/021 16/422 |
| 5,228,610 A | * | 7/1993 | Spence | B25F 5/021 224/267 |

(Continued)

FOREIGN PATENT DOCUMENTS

| | | | | |
|---|---|---|---|---|
| DE | 19930008 A1 | * | 3/2000 | B25F 5/021 |
| DE | 102009046068 A1 | * | 5/2011 | A01G 3/00 |

OTHER PUBLICATIONS

Robohandle Photo Gallery, retrieved Mar. 24, 2016.

*Primary Examiner* — Eret C McNichols (57) ABSTRACT

A hand tool support device includes an attachment bracket, at least one armband, at least one transfer rod, and a flexible connector. The attachment bracket is configured to be attached to a hand tool body of a powered hand tool having a hand tool grip configured to be held by a user. The hand tool body has a tool bit rotatable about and/or reciprocative along a tool axis. The armband is configured to receive a forearm of the user. The armband has an armband axis. The transfer rod extends between and couples the armband to the attachment bracket. The flexible connector is included at a lengthwise location of the transfer rod and enables movement of the armband axis relative to the attachment bracket, and absorbs at least one of torque, vibration, and shock on the gripping hand, wrist, and forearm of the user.

20 Claims, 7 Drawing Sheets

(56) References Cited

U.S. PATENT DOCUMENTS

| | | | | |
|---|---|---|---|---|
| 5,445,479 | A * | 8/1995 | Hillinger | B25F 5/00 16/430 |
| 5,661,960 | A * | 9/1997 | Smith | A01D 34/902 30/276 |
| 5,716,087 | A * | 2/1998 | Backich | A01B 1/02 16/422 |
| 6,324,728 | B1 * | 12/2001 | Blankenheim | B25F 5/021 16/110.1 |
| 7,637,882 | B2 * | 12/2009 | Carman, Jr. | A01B 1/00 16/422 |
| 7,788,962 | B2 * | 9/2010 | Chiasson | B25B 27/10 29/751 |
| 8,162,074 | B2 * | 4/2012 | Cook | B23B 45/001 16/114.1 |
| 8,776,648 | B2 | 7/2014 | Lee | |
| 9,266,231 | B1 * | 2/2016 | Neale | B25G 1/01 |
| 9,661,883 | B2 * | 5/2017 | Neale | B25G 1/01 |
| 2002/0132570 | A1 | 9/2002 | Berg | |
| 2004/0202516 | A1 * | 10/2004 | Lanser | B23Q 9/02 408/1 R |
| 2006/0174449 | A1 * | 8/2006 | Hughes | A61F 4/00 16/430 |
| 2008/0282507 | A1 * | 11/2008 | Chiasson | B25B 27/10 16/440 |
| 2009/0287352 | A1 | 11/2009 | Geist | |
| 2012/0012677 | A1 * | 1/2012 | Crossley, III | B05B 9/01 239/526 |
| 2013/0020105 | A1 * | 1/2013 | Cook | B25F 5/026 173/170 |
| 2015/0343586 | A1 | 12/2015 | Hatch | |
| 2016/0196727 | A1 * | 7/2016 | Aviles | G08B 6/00 340/407.1 |

* cited by examiner

HAND TOOL SUPPORT DEVICE AND METHOD

FIELD

The present disclosure relates generally to powered hand tools and, more particularly, to a device and method for supporting a powered hand tool.

BACKGROUND

Powered hand tools (i.e., hand-held power tools) are used extensively in manufacturing. Powered hand tools may be electrically-powered and/or pneumatically-powered, and may be configured to rotate and/or reciprocate a tool bit to perform an operation on a part or assembly. For example, a production program may incorporate the use of power drills for drilling holes in a workpiece, fastener drivers for installing fasteners, power grinders for cutting, grinding, or polishing a workpiece, and a variety of other types of power tools.

Many powered hand tools include a hand grip with which a user supports the weight of the hand tool and guides the hand tool using one hand (e.g., a gripping hand). During operation of the hand tool, the rotation and/or reciprocation of the tool bit may generate torque, vibration, and/or shock which may be transmitted to the user's gripping hand and wrist. Unfortunately, the weight of the powered hand tool borne by the user's gripping hand can fatigue the user over time. The transmission of torque, vibration, and/or shock to the user's gripping hand and wrist can add to the fatigue.

As can be seen, there exists a need in the art for a device and method for supporting a powered hand tool that reduces the weight borne by the user's gripping hand and wrist, and also reduces the amount of torque, vibration, and/or shock transmitted to the gripping hand and wrist.

SUMMARY

The above-noted needs associated with powered hand tools are specifically addressed and alleviated by the present disclosure which provides a hand tool support device having an attachment bracket, at least one armband, at least one transfer rod, and a flexible connector. The attachment bracket is configured to be attached to a hand tool body of a powered hand tool having a hand tool grip configured to be held by a user. The hand tool body has a tool bit rotatable about and/or reciprocative along a tool axis. The armband is configured to receive a forearm of the user. The armband has an armband axis. The transfer rod extends between and couples the armband to the attachment bracket. The flexible connector is included at a lengthwise location of the transfer rod and enables movement of the armband axis relative to the attachment bracket, and absorbs at least one of torque, vibration, and shock on the gripping hand, wrist, and forearm of the user.

In a further embodiment, disclosed is a hand tool support device having an attachment bracket, a pair of armbands, a pair of transfer rods, and a flexible connector included with each transfer rod. The attachment bracket is configured to be attached to a hand tool body of a powered hand tool having a hand tool grip configured to be held by a user. The hand tool body has a tool bit rotatable about and/or reciprocative along a tool axis. The pair of armbands include a proximal armband located nearest the attachment bracket and a distal armband located furthest from the attachment bracket. The proximal armband and the distal armband are interconnected by one or more connecting rods. The pair of transfer rods are arranged in laterally-spaced relation to each other and couple the proximal armband to the attachment bracket. The pair of flexible connectors are respectively included with the pair of transfer rods and couple the transfer rods to the attachment bracket.

Also disclosed is a method of supporting a powered hand tool. The method includes holding, with a gripping hand of a forearm of a user, a hand tool grip of a hand tool body of a powered hand tool having a tool bit at least one of rotatable about and reciprocative along a tool axis of the tool bit. In addition, the method includes engaging the forearm to at least one armband of a hand tool support device having at least one transfer rod extending from the armband to an attachment bracket mounted to the hand tool body. The method also includes supporting, using the forearm engaged to the armband, a portion of a weight of the powered hand tool.

The features, functions and advantages that have been discussed can be achieved independently in various embodiments of the present disclosure or may be combined in yet other embodiments, further details of which can be seen with reference to the following description and drawings below.

BRIEF DESCRIPTION OF THE DRAWINGS

These and other features of the present disclosure will become more apparent upon reference to the drawings wherein like numbers refer to like parts throughout and wherein.

DETAILED DESCRIPTION

Figure 1:
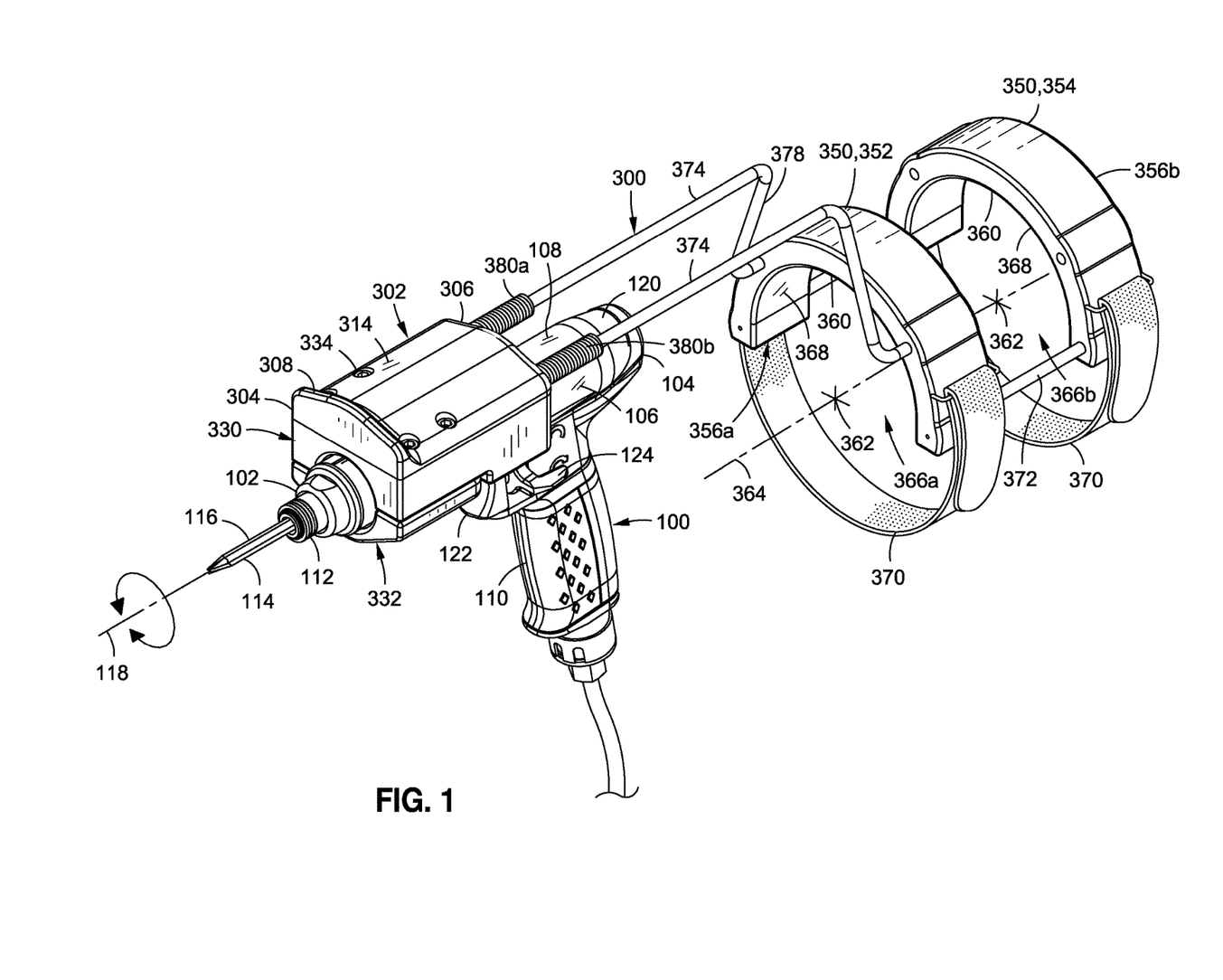
FIG. 1 is a perspective view of an example of a hand tool support device for a powered hand tool.

Referring now to the drawings wherein the showings are for purposes of illustrating preferred and various embodiments of the disclosure, shown in FIG. 1 is a perspective view of an example of a hand tool support device 300 attached to a powered hand tool 100. The powered hand tool 100 provides rotational motion and/or reciprocating motion to a tool bit 114 or other accessory attached to a tool forward end 102 of the powered hand tool 100 for performing an operation on a workpiece. The presently-disclosed hand tool support device 300 includes an attachment bracket 302 which may be removably attached to the powered hand tool 100. In addition, the hand tool support device 300 includes one or more armbands 350 configured to receive or be engaged with a forearm 206 of a user 200 (e.g., see FIG. 3). The armbands 350 are coupled to the attachment bracket 302 by one or more transfer rods 374 extending between the armbands 350 and the attachment bracket 302. The transfer rods 374 advantageously transfer a portion of the weight of the powered hand tool 100 to the user's forearm 206 against which the armbands 350 bear, thereby reducing the amount of weight supported by the user's gripping hand 202 and wrist 208. In addition, the transfer rods 374 transfer a portion of the torque to the user's forearm 206, thereby reducing the amount of torque that would have otherwise been imposed on the user's gripping hand 202 and wrist 208.

The hand tool support device 300 includes at least one flexible connector at a lengthwise location of at least one of the transfer rods 374. In the illustrated embodiment, the hand tool support device 300 includes a pair of flexible connectors 380a and 380b. In the embodiment shown, each flexible connector 380a and 380b is disposed between the attachment bracket 302 and a rod end 376 of a respective transfer rod 374. The flexible connectors 380a, 380b reduce and/or absorb at least a portion of the torque, vibration, and/or shock that would otherwise be transmitted to the user's forearm 206 during operation of the powered hand tool 100. In addition, the flexible connectors 380a, 380b provide a limited amount of flexibility in the orientation of the armband 350 relative to the attachment bracket 302. The attachment bracket 302 additionally provides a safe and secure location for the user's guiding hand (not shown; located opposite the user's gripping hand 202) to grasp, guide, and support a portion of the weight of the powered hand tool 100 while a remaining portion of the weight is supported by the user's gripping hand 202 and by the user's forearm 206. By transferring at least a portion of the weight of the powered hand tool 100 from the gripping hand 202 to the forearm 206 of the gripping hand 202, the amount of weight otherwise supported by the gripping hand 202 acting alone is reduced, which reduces the amount of strain on the user's gripping hand 202 and wrist 208. In addition to the energy absorption provided by the flexible connectors 380a, 380b, the attachment bracket 302 and/or the armbands 350 of the hand tool support device 300 may also include energy-absorbing features described below which reduce the total amount of torque, vibration, and/or shock transmitted to the user 200 during operation of the powered hand tool 100.

Referring to FIGS. 1-4, as indicated above, the powered hand tool 100 includes a tool bit 114 defining a tool axis 118. The tool bit 114 may be removably secured to the hand tool body 106 by a chuck 112 or collet located on a tool forward end 102 of the hand tool body 106. The hand tool body 106 contains a tool driving mechanism 120 which may be an electric motor, a pneumatic drive mechanism, or other mechanism for rotating the tool bit 114 about the tool axis 118 and/or for reciprocating the tool bit 114 along the tool axis 118. In the example of a pneumatically-powered screwdriver, the hand tool body 106 may include an air drive mechanism (not shown) configured to convert compressed air from an air hose (not shown) into rotational motion of a screwdriver bit 116 for installing screws into threaded holes or receptacles. In the example of an impact wrench (not shown), the tool driving mechanism 120 may provide high-torque pulsing rotational motion to a socket bit (not shown) for installing or loosening bolts or nuts. In other examples not shown, the powered hand tool 100 may be configured as a drill gun providing constant rotational torque, an impact driver or hammer drill providing constant or pulsing rotational torque and reciprocative impact force, a rivet gun providing pulsing reciprocative force, or any other type of powered hand tool 100.

In the example shown in the figures, the powered hand tool 100 has a hand tool grip 110 extending laterally outwardly from the hand tool body 106. Although shown as a pistol grip, the hand tool grip 110 may be provided in any one of a variety of configurations that enable a user 200 to hold the hand tool grip 110 by the user's gripping hand 202 (e.g., FIG. 3). The hand tool grip 110 may include a depressible activation trigger 122 or switch for activating the hand tool and/or for varying the rotational speed and/or reciprocative speed of the tool bit 114. The activation trigger 122 may be normally biased to an off position. The hand tool may include a reverse switch 124 for reversing the direction of rotation of the tool bit 114, enabling one to use the powered hand tool 100 for installing fasteners and/or drilling holes, or removing fasteners and/or backing a drill bit out of a hole.

Referring still to FIGS. 1-4, as indicated above, the presently-disclosed hand tool support device 300 includes the attachment bracket 302 which is configured to be coupled to, attached to, or clamped onto the hand tool body 106 of the powered hand tool 100. In the example shown, the attachment bracket 302 is clamped onto the hand tool body 106 at a location between the hand tool grip 110 and the tool forward end 102. However, the attachment bracket 302 may be clamped onto the hand tool body 106 at any location between the forward end 102 and the aft end 104 of the powered hand tool 100. For example, the attachment bracket 302 may be mounted to the hand tool body 106 at a location between the hand tool grip 110 and the aft end 104 of the hand tool body 106. Preferably, the attachment bracket 302 is mounted to the hand tool body 106 at a location between the hand tool grip 110 and the forward end 102 which may allow for a shorter length of the attachment bracket 302 and better control of the tool bit 114 than would be available if the attachment bracket 302 were attached to the aft end 104 of the hand tool body 106. The attachment bracket 302 is preferably coupled to the hand tool body 106 in a manner preventing rotation and axial movement of the attachment bracket 302 relative to the hand tool body 106.

Figure 2:
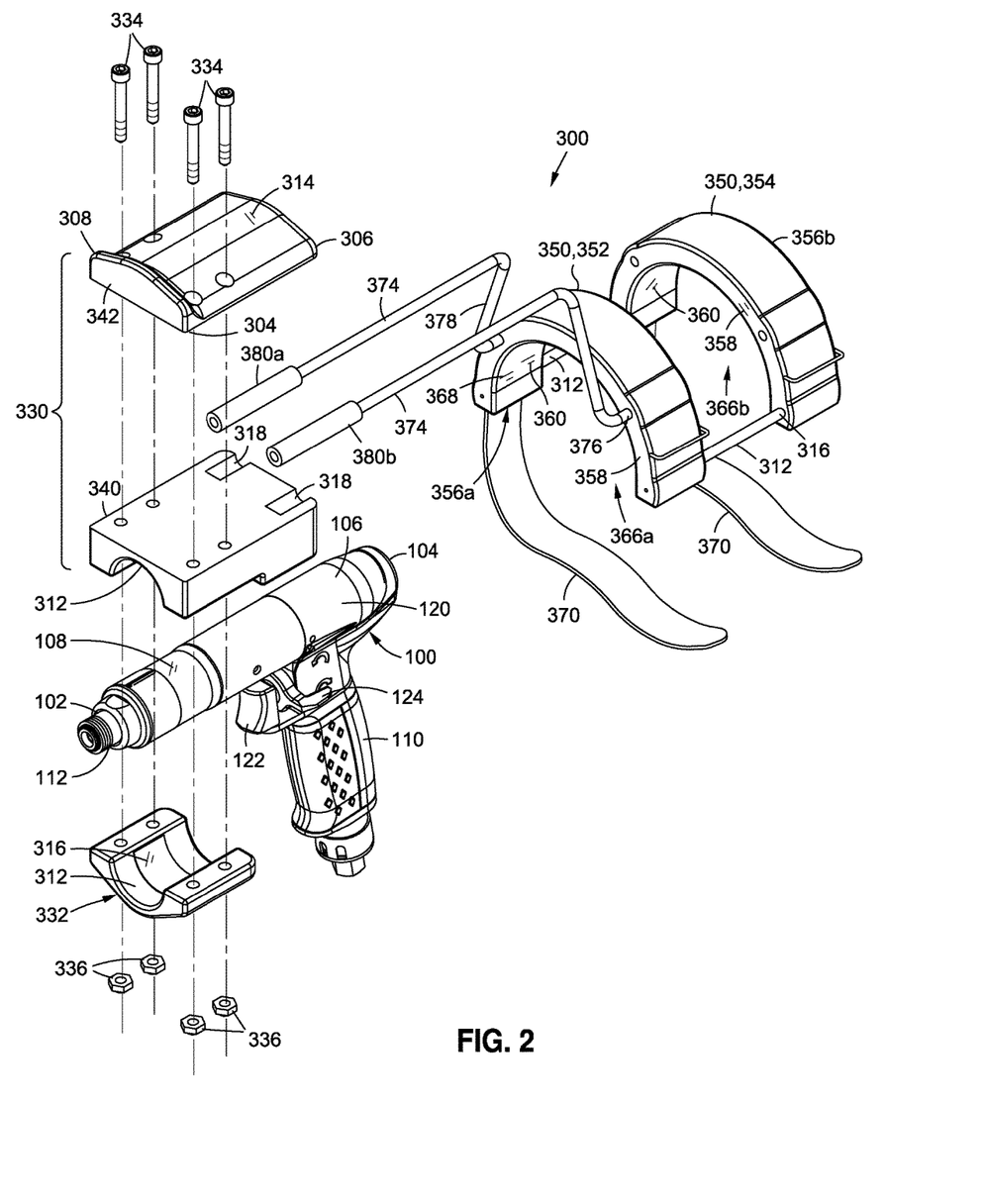
FIG. 2 is a exploded perspective view of the hand tool support device of FIG. 1 and illustrating an attachment bracket attached to a hand tool body of the powered hand tool and further illustrating a proximal armband and a distal armband coupled to the attachment bracket by a pair of transfer rods.
Figure 5:
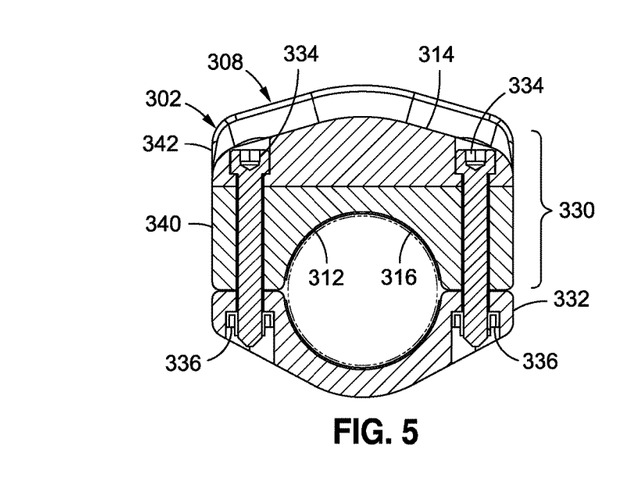
FIG. 5 is a sectional view of the hand tool support device taken along line 5 of FIG. 4 and illustrating an attachment bracket comprising a first bracket portion and a second bracket portion clamped onto the powered hand tool.

Referring to FIGS. 2 and 5, the attachment bracket 302 may be provided as a multi-piece bracket assembly. In the example shown, the attachment bracket 302 includes a first bracket portion 330 and a second bracket portion 332 configured to be fastened to each other in a manner such that the hand tool body 106 is clamped therebetween using fasteners 334 such as bolts or screws extended through holes in the first and second bracket portion 330, 332 and secured by nuts 336 or other types of threaded receptacles. The first bracket portion 330 and the second bracket portion 332 are configured to be clamped onto or attached to the hand tool body 106 without interfering with the rotation and/or reciprocation of the tool bit 114 or the chuck 112 or collet. The inner surface 312 of the first bracket portion 330 may be shaped or contoured complementary to the exterior surface 108 on the upper portion of the hand tool body 106. Likewise, the inner surface 312 of the second bracket portion 332 may be shaped or contoured complementary to the exterior surface 108 of the lower portion of the hand tool body 106.

As shown in FIGS. 1-5, the first bracket portion 330 may be mounted to the upper portion of the hand tool body 106, and the second bracket portion 332 may be mounted to the lower portion of the hand tool body 106 such that the joint or interface between the first bracket portion 330 and the second bracket portion 332 is horizontally oriented as shown in FIG. 5. However, the first bracket portion 330 and the second bracket portion 332 may be mounted on opposing left and right sides of the hand tool body 106 such that the joint or interface between the first bracket portion 330 and the second bracket portion 332 is vertically oriented (not shown). Even further, the attachment bracket 302 may be provided in any one a variety of multi-piece bracket assembly configurations for clamping or attaching to the hand tool body 106 with any number of joints or interfaces having any one a variety of different orientations between the parts of the multi-piece bracket assembly.

In another example not shown, the attachment bracket 302 may be provided as a one-piece unitary attachment bracket configured to be slid over the tool forward end 102 of the hand tool body 106. Such a one-piece unitary attachment bracket may include an inner surface 312 that is tapered or otherwise configured complementary to the exterior surfaces 108 of the hand tool body 106 such that the inner surfaces 312 of the attachment bracket engage the exterior surfaces 108 of the hand tool body 106 when the attachment bracket is slid onto the hand tool body 106. One or more fasteners (not shown) may engage one or more structural features on the hand tool body 106 to fixedly and non-movably secure the one-piece unitary attachment bracket to the hand tool body 106. For example, the hand tool body 106 may include one or more structural tabs (not shown) protruding outwardly from the hand tool body 106 for fastening such a one-piece unitary attachment bracket to the hand tool body 106. In still further examples, instead of the attachment bracket 302 clamping onto the exterior surfaces 108 of the hand tool body 106, the attachment bracket 302 may be removably fastened to one or more attachment holes or structural tabs (not shown) protruding from the hand tool body 106. In any one of the above disclosed attachment bracket configurations, optional shock-absorbing (e.g., rubber, foam) spacers or grommets (not shown) may be installed between the fasteners and the hand tool body 106 to absorb vibration and/or shock generated during operation of the powered hand tool 100.

The attachment bracket 302 may include a shock-absorbing bracket liner 316 comprising a resiliently compressible material covering or lining at least a portion of one or more inner surfaces 312 of the attachment bracket 302. In one example, the bracket liner 316 material may be adhesively bonded to one or more of the inner surfaces 312 of the attachment bracket 302. In other examples, bracket liner material may be unattached to the attachment bracket 302, and instead may be clamped between the inner surfaces 312 of the attachment bracket 302 and the exterior surfaces 108 of the hand tool body 106 when clamping the attachment bracket 302 to the hand tool body 106. The resiliently compressible material of the bracket liner 316 may be foam, foam rubber, silicone rubber, sponge rubber, neoprene, or any one a variety of different resiliently compressible material compositions. Advantageously, the bracket liner 316 may absorb vibration and/or shock generated during operation of the powered hand tool 100. In this regard, the bracket liner 316 may attenuate at least a portion of the vibration and/or shock that may otherwise be transmitted to the user's guiding hand (not shown) holding the outer surfaces 314 of the attachment bracket 302. In addition, the shock-absorbing bracket liner 316 may absorb or attenuate at least a portion of the vibration and/or shock that may otherwise be transmitted to the user's forearm 206 engaged to the armbands 350 of the hand tool support device 300.

In the example of FIGS. 2 and 5, the first bracket portion 330 and the second bracket portion 332 each have an inner surface 312 and an outer surface 314. The inner surfaces 312 of the first bracket portion 330 and/or the second bracket portion 332 may be at least partially covered by or lined with a bracket liner 316 comprising the above-described resiliently compressible material. The bracket liner 316 may be configured to conform to the exterior surface 108 of the hand tool body 106 when the first bracket portion 330 and second bracket portion 332 are clamped onto the hand tool body 106, and may advantageously absorb vibration and/or shock generated during rotation and/or reciprocation of the tool bit 114.

Figure 3:
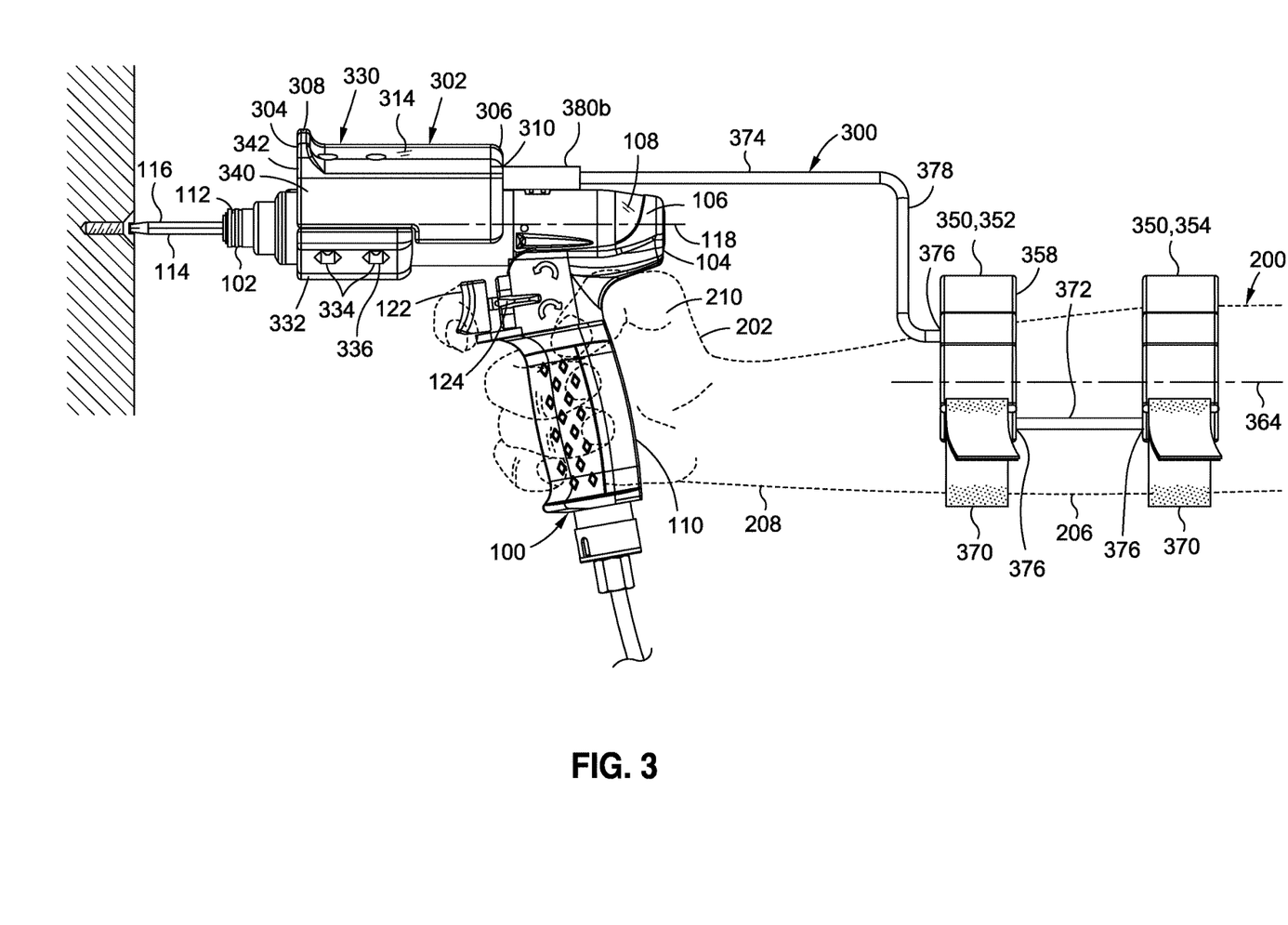
FIG. 3 is a side view of the hand tool support device clamped to the powered hand tool and illustrating a user's gripping hand gripping the hand tool grip and further illustrating the proximal armband and the distal armband secured to the user's forearm.

Referring to FIGS. 1-5, as mentioned above, the attachment bracket 302 includes an outer surface 314. In the example shown, the outer surface 314 may be oriented generally parallel to the tool axis 118 when the powered hand tool 100 is viewed from the side as shown in FIG. 3. Additionally, one or more of the outer surfaces 314 of the attachment bracket 302 may have a generally convex shape with planar (not shown), faceted (not shown), and/or convexly-curved surfaces when the hand tool body 106 is viewed from the end, as shown in FIG. 5. Regardless of the specific configuration of the attachment bracket 302, one or more of the outer surfaces 314 of the attachment bracket 302 may be contoured in a manner allowing a user's guiding hand (not shown) to comfortably and securely hold onto the attachment bracket 302 to allow the guiding hand to more precisely control and guide the tool bit 114 during operation of the powered hand tool 100 while the user's gripping hand 202 (FIG. 3) controls the operation (e.g., on/off/speed) of the powered hand tool 100. As shown in FIG. 5, the fastener heads and the nuts 336 (or equivalent) of the fasteners 334 clamping the first bracket portion 330 to the second bracket portion 332 may be recessed below the outer surfaces 314 of the attachment bracket 302 to maintain a smooth surface for the user's guiding hand.

The attachment bracket 302 may include a lip 308 protruding laterally outwardly from the outer surface 314. In the example shown, the lip 308 is located on a bracket forward end 304 of the attachment bracket 302 on an upper side. The lip 308 may be located on a forward end of the first bracket portion 330 and/or the lip 308 may be located on a forward end of the second bracket portion 332. Advantageously, the lip 308 of the attachment bracket 302 provides a surface against which the user's guiding hand may apply axial force along a direction parallel to the tool axis 118. For example, the user's guiding hand may bear against the lip 308 to allow the user 200 to apply axial force on a drill bit when drilling a hole into a workpiece, when using a rivet gun to install a rivet, or when performing any one of a variety of other operations wherein it is desirable to apply axial force to the tool bit 114 against a workpiece. In addition, the lip 308 may prevent the user's guiding hand from slipping off of the attachment bracket 302. In some examples, the lip 308 may protrude from the outer surface 314 by 0.2-2.0 inches.

Referring still to FIGS. 1-5, in an embodiment, the first bracket portion 330 may be provided in a two-piece arrangement including an inner part 340 and an outer part 342 mateable to each other to enable the clamping of the flexible connectors 380a, 380b to the attachment bracket 302, as described in greater detail below. The inner part 340 may be positioned or clamped against the hand tool body 106. The outer part 342 may be positioned on a side of the inner part 340 opposite the hand tool body 106. The outer surface 314 of the outer part 342 may be contoured as described above for grasping or holding by the user's guiding hand. In addition, the outer part 342 may include the above-described lip 308 against which a user 200 may apply an axial force to the powered hand tool 100 along a direction parallel to the tool axis 118.

Referring still to FIGS. 1-4, the hand tool support device 300 includes at least one armband 350. In the example shown, the hand tool support device 300 includes a proximal armband 352 located nearest the attachment bracket 302, and a distal armband 354 located furthest from the attachment bracket 302. The proximal armband 352 is axially spaced apart from the distal armband 354 along the armband axis 364. In some examples, forwardmost side edges 358 of the distal armband 354 may be located within approximately 1-10 inches of the aftmost side edges 358 of the proximal armband 352. By spacing the proximal armband 352 apart from the distal armband 354, the proximal armband 352 may act as a fulcrum that bears at least a portion of the weight of the powered hand tool 100, and the distal armband 354 farthest from the powered hand tool 100 resists the rotational force of the weight of the powered hand tool 100 acting about the fulcrum, thereby reducing the weight borne by the user's gripping hand 202 and wrist 208.

The proximal armband 352 and the distal armband 354 may be interconnected by one or more connecting rods 372, such as the pair of connecting rods 372 shown in the figures. The rod ends 376 of the connecting rods 372 may be fixedly secured to or may be engaged with the side edges 358 of the proximal armband 352 and distal armband 354. The rod ends 376 of the connecting rods 372 may have surface features (not shown) such as protrusions, knurls, knobs, grooves, and/or wings or ribs (e.g., axial ribs, radial ribs) or any one of a variety of other features to stake and/or anchor the rod ends 376 into the armbands 352, 354 and prevent movement (e.g., pull-out and/or twisting) of the rod ends 376 relative to the armbands 352, 354. In some examples, the connecting rods 372 may be configured to be adjustable in length to allow the hand tool support device 300 to be fitted to the forearms 206 of different users. For example, although not shown, the connecting rods 372 may be telescoping and may be lockable at the desired length once adjusted. To simplify manufacturing of the hand tool support device 300, the connecting rods 372 may be formed of the same material and may have the same diameter as the transfer rods 374. However, the connecting rods 372 may have a different material and/or different geometry than the transfer rods 374.

An armband 350 may have an arcuate shape on at least an inner surface 360 of the armband 350 against which the user's forearm 206 bears. The armbands 350 are configured to be engaged to the user's forearm 206. As described in greater detail below, one or more of the armbands 350 may include a strap 370 for securing the user's forearm 206 to the armband 350. An armband 350 may have a geometric center 362 (e.g., an area centroid) and an armband axis 364 passing through the geometric center 362. As shown in FIG. 3, the armband axis 364 may be offset from the tool axis 118 at least at the location of the armband 350. The offset may allow the armband 350 to resist torque that may be generated by the powered hand tool 100 such as during an abrupt start or stop of the tool bit 114. In this regard, the armband axis 364 may be offset at least at the location where the armband axis 364 intersects the armband plane (not shown) at a forwardmost side edge 358 of an armband 352, 354. The amount of the offset may be in the range of from 1.0-10 inches or larger, and may be dictated in part by the geometry and dimensions of the powered hand tool 100.

One or more of the armbands 350 may have an open cross section (e.g., 356a, 356b) having an open side (e.g., 366a, 366b). As shown in FIGS. 1-2 and 7-8, the proximal armband 352 has a first open cross section 356a having a first open side 366a, and the distal armband 354 has a second open cross section 356b having a second open side 366b. The armbands 350 with open cross section may have a semi-circular shape extending around 180 degrees. However, an armband 350 may be provided with an open cross sectional shape extending in the range of from 90-350 degrees. In FIGS. 1-2, the first open side 366a of the proximal armband 352 and the second open side 366b of the distal armband 354 face in the same direction. However, in the below-described example of FIGS. 7-8, the first open side 366a of the proximal armband 352 faces in a direction generally opposite the second open side 366b of the distal armband 354.

In the examples shown in FIGS. 1-3 and 7-8, the proximal armband 352 and/or the distal armband 354 may include a strap 370 extending from at least one of opposing armband ends. The straps 370 may be configured to secure or cinch the armband 350 to the forearm 206 of the user 200. One or more of the straps 370 may be provided as an elastic strap such as a rubber strap or other material that is stretchable along a lengthwise direction. Alternatively, a strap 370 may be formed of non-elastic or non-stretchable material such as hook and loop material (e.g., Velcro™). In a further example, or more of the armbands 350 may include non-elastic straps extending from the armband ends and securable together using a buckle, snaps, buttons, hook and loop material, or any one a variety of other mechanisms for strapping the forearm 206 of the user 200 against an armband 350. In any one of the examples disclosed herein, the straps 370 may be length-adjustable.

Although not shown, one or more of the armbands 350 may have a closed cross-section (not shown). In one example, a closed cross section armband may define a complete circle. In this regard, one or more of the armbands 350 may be provided in any one of a variety of generally curved shapes, including a closed cross section such as a circular shape or an oval shape, or an open cross section (e.g., 356a, 356b) such as a semi-circular shape or a semi-oval shape. In some examples, the proximal armband 352 and the distal armband 354 may be geometrically identical to each other to minimize the total quantity of unique parts required to assemble the hand tool support device 300.

The armbands 350 may be sized and configured complementary to the size and shape of the user's forearm 206. For example, an armband 350 may have a diameter or width in the range of from 2-6 inches. Alternatively, an armband 350 may have an oval shape (not shown) or a semi-oval shape (not shown) having a width along the major axis of 2-6 inches and a width along the minor axis of 1-4 inches. One or more of the armbands 350 may have a radial thickness in the range of from 0.06-0.50 inch, excluding an armband liner 368. In addition, one or more of the armbands 350 may have a width along a direction parallel to the armband axis 364 of from 0.12-3.0 inches or larger. For an armband 350 having an oval, semi-oval, circular, or semi-circular shape, the armband axis 364 is oriented perpendicular to the armband plane as defined by the geometry (e.g., circular, oval) of a side edge 358 of the armband 350.

Referring still to FIGS. 1-4, the armbands 350 may be rigid or non-rigid and may be formed of metallic material and/or non-metallic material. For example, a metallic armband may preferably be formed of lightweight material such as aluminum, magnesium, and/or titanium although other metallic materials may be used. A non-metallic armband may preferably be formed of a lightweight, high-strength plastic or polymeric material such as nylon, acrylonitrile-butadiene-styrene (ABS), acrylic, polycarbonate, polyethylene, or fiber-reinforced polymer-matrix-material such as graphite epoxy, or any one a variety of other plastic or polymeric materials. In some examples, the armbands 350 may be non-rigid and may be adjustable in diameter or width to match the size (e.g., diameter or width) of the forearm 206 of the user 200. The armbands 350 may be formed of a material (e.g., aluminum sheet) that allows each armband 350 to be bent or formed into a shape and size that matches the shape and size of the user's forearm 206. The armbands 350 may be manufactured by any one a variety of additive or subtractive manufacturing techniques including, but not limited to, injection molding, compression molding, casting, machining, three-dimensional printing, or other methods. In some examples, the armbands 350 may be hollow to minimize the overall weight of the hand tool support device 300, and thereby reduce or minimize fatigue on the user 200.

The proximal armband 352 and/or the distal armband 354 may include a shock-absorbing armband liner 368 formed of a resiliently compressible material lining at least a portion of the inner surface 360 of the armband 350 to provide protection and comfort to the forearm 206 against shock and/or vibration during operation of the powered hand tool 100. The armband liner 368 material may be adhesively bonded to the inner surface 360 of the armband, or the armband liner 368 material may be unattached to the inner surface 360. The resiliently compressible material of the armband liner 368 may be foam (e.g., closed-cell foam), foam rubber, silicone rubber, sponge rubber, neoprene, neoprene, or any other resiliently compressible material or a combination thereof.

Referring to FIGS. 1-4 and 7-8, the hand tool support device 300 includes at least one transfer rod 374 coupling the attachment bracket 302 to at least one armband 350, as indicated above. The transfer rods 374 may be generally aligned with the tool axis 118 and may extend in the same general direction as the tool axis 118. In the example shown, a pair of transfer rods 374 extend from the bracket aft end 306 of the attachment bracket 302 to the side edges 358 of the proximal armband 352. The forwardmost edge (e.g., nearest the attachment bracket 302) of the proximal armband 352 may be located within approximately 2-18 inches of the bracket aft end 306 of the attachment bracket 302. In some examples, at least a portion of the transfer rod 374 may be approximately parallel (e.g., within ±10 degrees) to the armband axis 364 of the armband 350 and/or approximately parallel (e.g., within ±10 degrees) to the tool axis 118.

Referring still to FIGS. 1-4 and 7-8, in the example shown, the pair of transfer rods 374 are arranged in laterally-spaced parallel relation to each other. In an embodiment, the pair of transfer rods 374 may be separated by a lateral spacing of approximately 1-12 inches at the juncture of the transfer rods 374 with the attachment bracket 302 and/or at the juncture of the transfer rods 374 with the proximal armband 352. As shown in FIG. 1-3, the transfer rods 374 may each include a joggle 378 in a lateral direction relative to the armband axis 364. The joggle 378 in the transfer rods 374 may facilitate the armband axis 364 being offset from the tool axis 118. The length of the joggle 378 may be in the range of 1-10 inches at the location of the armband 350. However, in other examples, the transfer rods 374 may be straight and may be oriented at an angle relative to the tool axis 118 when the hand tool support device 300 is viewed from the side. In a further embodiment, the transfer rods 374 may be slightly curved or bowed (e.g., when viewed from the side) in order to allow the armband axis 364 to be offset from the tool axis 118.

The rod ends 376 of the transfer rods 374 may be coupled to the bracket aft end 306 of the attachment bracket 302 at separate locations. Likewise, the rod ends 376 of the transfer rods 374 may be coupled to the proximal armband 352 at separate locations. The rod ends 376 may be fixedly secured to the attachment bracket 302 and to the proximal armband 352 by any one of a variety of different means including adhesive bonding and/or mechanical attachment. The rod ends 376 of the transfer rods 372 may have surface features (not shown) such as protrusions, knurls, knobs, grooves, wings and/or ribs or any one of a variety of other features to stake and/or anchor the rod ends 376 into the attachment bracket 302 and/or into the proximal armband 352 and prevent movement (e.g., pull-out and/or twisting) of the rod ends 376 relative to the attachment bracket 302 and/or the proximal armband 352. For example, one or more of the rod ends 376 may be threadably engaged into threaded bores (not shown) or inserts (not shown) in the attachment bracket 302 and/or in the proximal armband 352. In an embodiment, the rod ends 376 of the transfer rods 374 may be inserted into and/or captured within the bracket aft end 306 of the attachment bracket 302. The opposite rod ends 376 of the transfer rods 374 may be inserted into and/or captured within the side edges 358 of the proximal armband 352. In another example, one or more of the rod ends 376 may be welded to the attachment bracket 302 and/or to the proximal armband 352. In still other examples, one or more of the rod ends 376 may include mechanical features or protrusions (e.g., wings, ribs, spikes, etc.), and the attachment bracket 302 and/or proximal armband 352 may be molded (e.g., injection molded) while the transfer rods 374 are positioned inside the injection mold (not shown).

The transfer rods 374 are preferably lightweight in order to minimize the overall mass of the hand tool support device 300. In an embodiment, one or more of the transfer rods 374 may be hollow. However, one or more the transfer rods 374 may be solid. The transfer rods 374 may have a diameter or a width in the range of approximately 0.13-1.0 inch. The transfer rods 374 may have a circular cross-section or a non-circular cross section. For example, one or more of the transfer rods 374 may have a polygonal cross sectional shape such as a square shape, a rectangular shape, a triangular-shaped, a hexagonal shape, or any one a variety of other shapes.

The transfer rods 374 may be formed of metallic material such as aluminum, magnesium, and/or titanium, or non-metallic material such as lightweight, high-strength plastic such as nylon, ABS, acrylic, polycarbonate, polyethylene, or composite material such as graphite epoxy. The transfer rods 374 may be adjustable in length to allow the hand tool support device 300 to be fitted to different users. For example, the transfer rods 374 may be formed of telescoping segments (not shown) that may be lockable at the desired length. The transfer rods 374 may be geometrically identical to each other to minimize the total quantity of unique parts of the hand tool support device 300.

Figure 4:
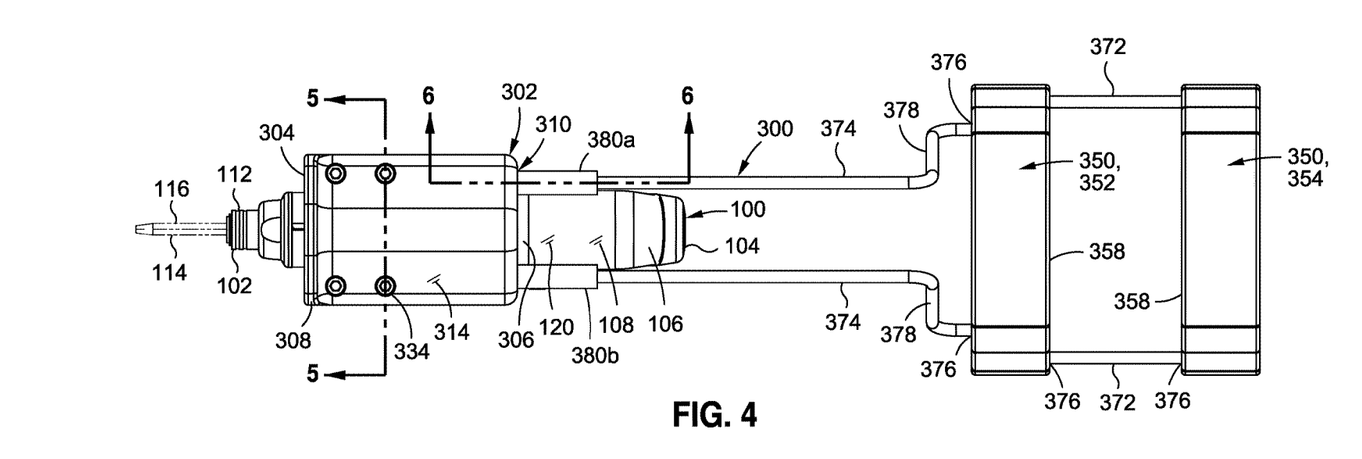
FIG. 4 is a top view of the hand tool support device of FIG. 1.

Referring to FIGS. 1-4 and 6, the hand tool support device 300 may include a flexible connector 380*a*, 380*b* at a lengthwise location of the respective transfer rods 374. Each flexible connector 380*a*, 380*b* may enable limited (e.g., less than 30 degrees) movement of the armband 350 relative to the attachment bracket 302. For example, the flexible connectors 380*a*, 380*b* may enable limited angular movement of the armband axis 364 relative to the tool axis 118 when the hand tool support device 300 is viewed from the side (e.g., FIG. 3) and/or when viewed from the top (FIG. 4). In a preferred embodiment, the flexible connectors 380*a*, 380*b* may allow less than 10 degrees of rotation of the armband axis 364 relative to the tool axis 118. In addition, when the hand tool support device 300 is viewed from the front or back (not shown), the flexible connectors 380*a*, 380*b* may allow the vertical axis (not shown) of the armband 350 to angularly rotate a maximum of 10 degrees relative to the hand grip axis (not shown) extending along a lengthwise direction of the tool hand grip.

In addition, as mentioned above, the flexible connectors 380*a*, 380*b* may absorb torque, vibration, and/or shock that may be generated during operation of the powered hand tool 100. In this regard, when the flexible connectors 380*a*, 380*b* are flexed or bent due to torque, vibration, and/or shock during operation of the powered hand tool 100, the flexible connectors 380*a*, 380*b* absorb at least a portion of the torque, vibration, and/or shock. In one example, the flexible connectors 380*a*, 380*b* may reduce the amount of torque, vibration, and/or shock otherwise imparted to the user's forearm 206 during rotation of a screwdriver bit 116 installing a fastener in a hole (e.g., FIG. 3). In addition, the flexible connectors 380*a*, 380*b* may reduce the amount of torque and shock otherwise imparted to the user 200 when the fastener bottoms out in a hole. In one example, the installation of a ³⁄₁₆-inch-diameter fastener may generate 30-40 in-pounds of torque that would otherwise be transmitted to the user 200 each time the fastener is installed.

Referring still to FIGS. 1-4 and 6, in an embodiment, the flexible connectors 380*a*, 380*b* may comprise a coil spring, an elastomeric tube, or any other type of connecting device that provides a limited amount of flex between each transfer rod 374 and the attachment bracket 302, or between each transfer rod 374 and the proximal armband 352 (not shown). A flexible connector 380*a*, 380*b* configured as a coil spring may be formed of metallic material (e.g., aluminum, titanium, steel) or plastic material (e.g., nylon, polyester, polycarbonate, etc.). Each coil spring may be include multiple wraps of a coil wire (not shown). The adjacent wraps of coil wire may be in direct physical contact with each other. The thickness or diameter of the individual coil wire may be in the range of approximately 0.010-0.20 inch.

A flexible connector 380*a*, 380*b* configured as an elastomeric tube may be formed of rubber, silicone rubber, latex, vinyl, nylon, polyurethane, polyethylene, polypropylene, or any other flexible polymeric material or material combinations. The elastomeric tube may have a wall thickness in the range of 0.03 to 0.25. The inner diameter or thickness of the flexible connectors 380*a*, 380*b* may be dictated by the outer diameter or width of the transfer rod 374. For example, for a 0.25 inch diameter connecting rod 372, the flexible connectors 380*a*, 380*b* may have an inside diameter of 0.24-0.26 inch, depending upon whether an interference fit or a clearance fit is desired. In this regard, the flexible connectors 380*a*, 380*b* (e.g., a coil spring or an elastomeric tube) may have an inner diameter sized and configured to provide an interference fit with the rod end 376.

In FIGS. 1-4 and 6, each flexible connector 380*a*, 380*b* is configured to be fixedly and non-rotatably secured to the bracket aft end 306 of the attachment bracket 302. For example, the attachment bracket 302 may include a pair of bores 310 formed in the bracket aft end 306. Each of the bores 310 may be sized and configured to receive a flexible connector 380*a*, 380*b*. The flexible connectors 380*a*, 380*b* may extend into the bores 310 of the attachment bracket 302 by approximately 0.25-2.0 inch and may protrude out of the attachment bracket 302 by approximately 0.25-2.0 inch. The outer surface of the flexible connectors 380 may have surface features (not shown) such as protrusions, knurls, knobs, grooves, wings, ribs, or any one of a variety of other features to stake and/or anchor the flexible connectors 380 to the attachment bracket 302 and/or to an armband 350 in a manner preventing pull-out and/or twisting of the flexible connectors 380 relative to the attachment bracket 302 and/or relative to the armband 350. The flexible connectors 380 may also be press-fit into the attachment bracket 302 or armband 350. Although the figures illustrate the flexible connectors 380*a*, 380*b* as protruding out of the upper portion of the attachment bracket 302, the attachment bracket 302 may be configured such that the flexible connectors 380*a*, 380*b* protrude out of the lower portion of the attachment bracket 302 in a manner such that the flexible connectors 380*a*, 380*b* or transfer rods 374 do not interfere with the ability of the user's gripping hand 202 to grasp the hand tool grip 110.

In the example shown, the flexible connectors 380 may be mounted to the attachment bracket 302 such that the flexible connectors 380 are generally parallel to the tool axis 118. However, the flexible connectors 380 may be mounted to the attachment bracket 302 in a manner such that the flexible connectors 380 are oriented at an angle (not shown) relative to the tool axis 118. The flexible connectors 380 may extend outwardly from the bores 310. The rod end 376 of each transfer rod 374 may be received in the portion of a flexible connector 380 extending out of the attachment bracket 302. The rod end 376 may be fixedly and non-rotatably coupled to the flexible connector 380 in a manner preventing pull-out and/or twisting of the rod end 376 relative to the flexible connector 380. A flexible connector 380 may overlap the connecting rod 372 by 0.25-1.0 inch. The rod ends 376 of the transfer rods 374 may be secured to the flexible connectors 380 by adhesive bonding, welding, mechanical engagement, or by any one a variety of other means. In some examples such as for a flexible connector 380 configured as an elastomeric tube, the rod ends 376 of the transfer rods 372 may have protrusions, knurls, knobs, grooves, wings, ribs and/or other surface features to stake and/or anchor the rod ends 376 into the flexible connector 380 and prevent twisting and/or pull-out of the rod ends from the flexible connector 380.

Figure 6:
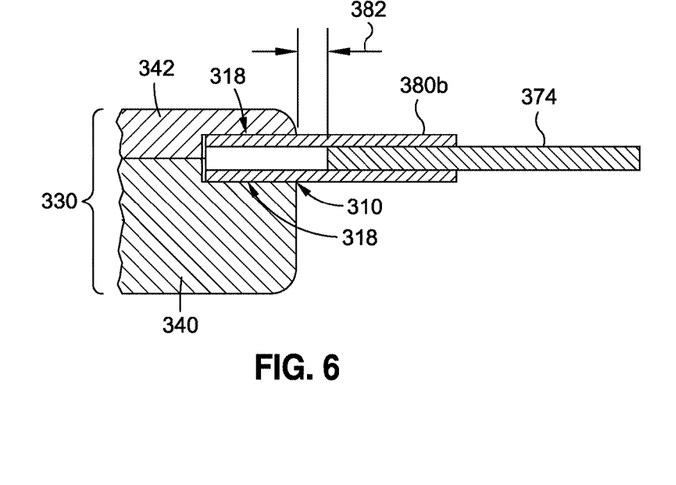
FIG. 6 is a partial sectional view of the hand tool support device taken along line 6 of FIG. 4 and illustrating a transfer rod coupled to the attachment bracket by a flexible connector.

Referring to FIG. 6, shown is an example of a transfer rod 374 coupled to a flexible connector 380*b* in a manner such that a gap 382 exists between the rod end 376 of the transfer rod 374 and the bracket aft end 306 of the attachment bracket 302. In one embodiment, the gap 382 may be in the range of approximately 0.10-1.0 inch and, more preferably 0.25-0.50 inch. Advantageously, by providing a gap 382 between the rod end 376 of each transfer rod 374 and the attachment bracket 302, the flexible connectors 380*a*, 380*b* may flex or stretch within the location of the gap 382, allowing the flexible connector 380*a*, 380*b* to absorb torque, vibration, and/or shock generated during operation of the powered hand tool 100. Although the figures illustrate the flexible connectors 380*a*, 380*b* mounted to the attachment bracket 302, the flexible connectors 380a, 380b may be mounted at any location along the length the transfer rods 374. For example, the flexible connectors 380a, 380b may couple the transfer rods 374 to the side edges 358 of the proximal armband 352. In a still further embodiment, each one of the transfer rods 374 may include a flexible connector (e.g., 380a, 380b) at some location between the attachment bracket 302 and the proximal armband 352. In this regard, a transfer rod 374 may be made up of a pair of end-to-end rod segments (not shown) that may be coupled together by a flexible connector (e.g., 380a, 380b) in a manner such that a gap 382 exists between the rod ends 376 of the end-to-end rod segments.

Referring to FIGS. 2 and 6, in the example shown, the inner part 340 and the outer part 342 of the first bracket portion 330 each have semi-cylindrical bore portions 318 formed in the aft end of the respective inner part 340 and outer part 342. When the inner part 340 is mated to the outer part 342, the semi-cylindrical bore portions 318 collectively form the bores 310 for receiving the flexible connectors 380a, 380b. Each bore 310 may have a diameter that is sized to provide an interference fit with a flexible connector 380a, 380b such that when the inner part 340 is mated to the outer part 342, the flexible connector 380a, 380b is fixedly clamped within the bore 310. Alternatively, the diameters of the bores 310 may be sized to provide a clearance fit with the flexible connector 380a, 380b, and the flexible connector 380a, 380b may be adhesively bonded or otherwise non-movably captured or secured within the bores 310.

Figure 7:
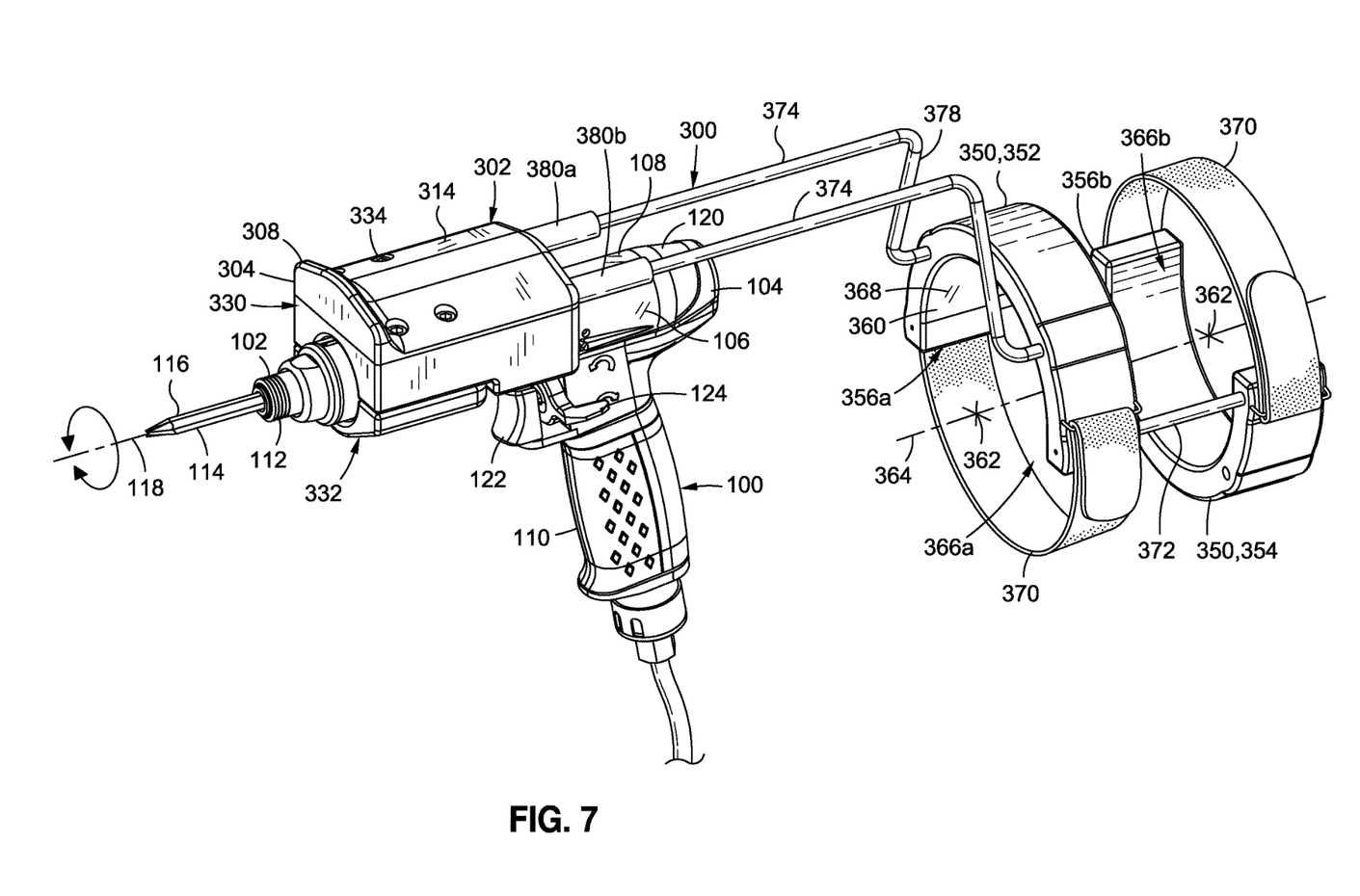
FIG. 7 is a perspective view of a further example of the hand tool device wherein a first open side of the proximal armband faces in a direction generally opposite the second open side of the distal armband.
Figure 8:
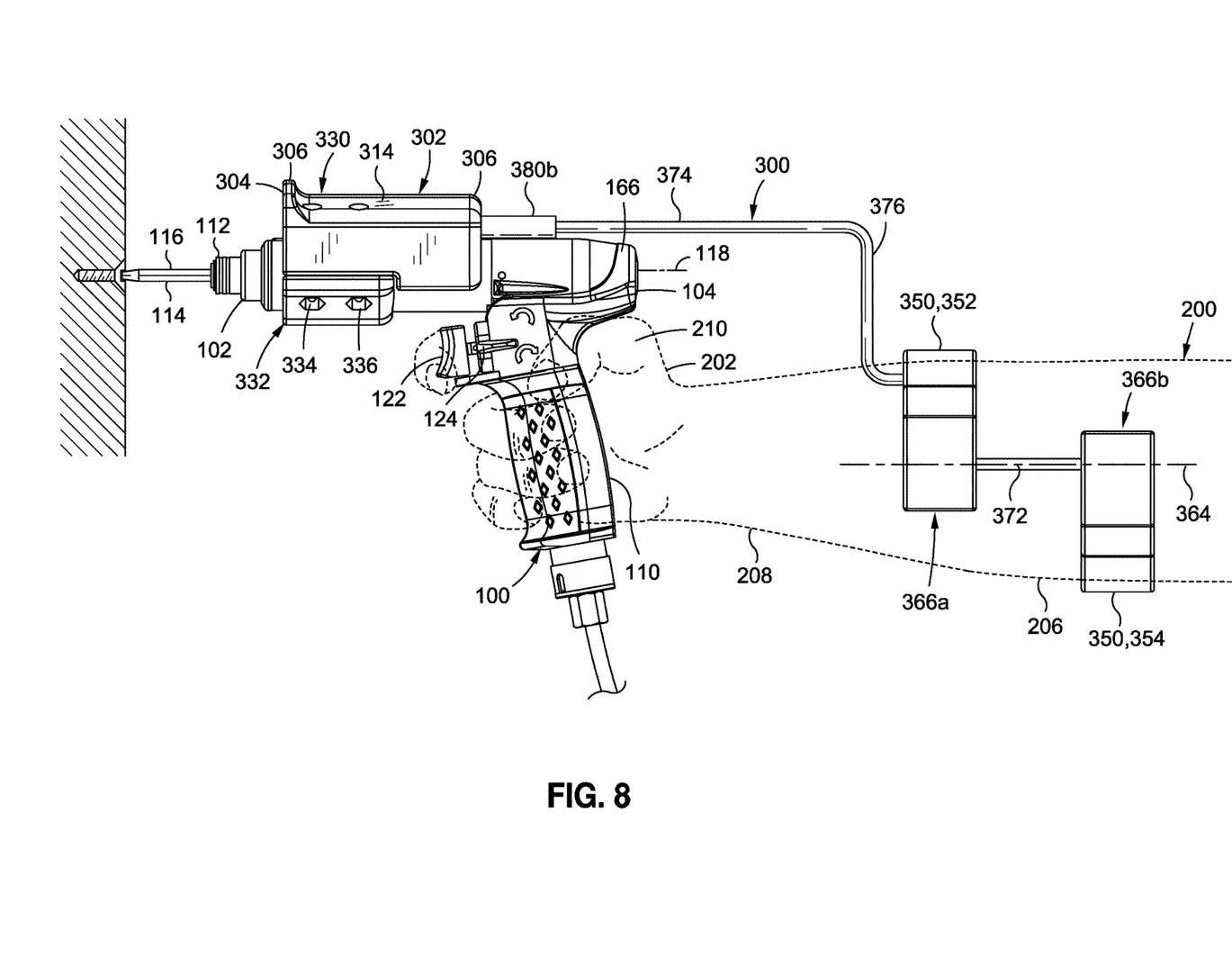
FIG. 8 is a side view of the hand tool device of FIG. 7 illustrating a user holding the hand tool grip with a gripping hand and the forearm engaged to the armbands.

Referring to FIG. 7, shown is a perspective view of a further example of the hand tool support device 300 wherein the proximal armband 352 and the distal armband 354 each have an open cross section 356a and 356b, respectively, each having an open side 366a and 366b, respectively. The open side 366a of the proximal armband 352 generally faces in a direction toward the open side 366b of the distal armband 354. Each armband 350 may include a strap 370 for securing the user's forearm 206 to the armband 350. FIG. 8 shows a user 200 holding the hand tool grip 110 with a gripping hand 202 and the forearm 206 engaged to the proximal armband 352 and the distal armband 354. The proximal armband 352 is configured to bear against the forearm 206 on the same side as the thumb 210 of the gripping hand 202, and the distal armband 354 is configured to bear against the side of the forearm 206 opposite the thumb 210. The proximal armband 352 acts as a fulcrum between the powered hand tool 100 and the distal armband 354. Additionally, the distal armband 354 acts to bear the weight of the powered hand tool 100 thereby reducing the amount of weight supported by the user's wrist 208 and gripping hand 202. More specifically, the opposite orientations of the proximal and distal armbands 352 and 354 enable the hand tool support device 300 to be self-positioned on the forearm 206 with the use of only a single hand (e.g. the user's gripping hand 202) operating the powered hand tool 100.

In operation, the proximal and distal armbands 352 and 354 improve ergonomic efficiency by transferring the forces generated by the weight of the powered hand tool 100, previously transferred directly to the user's gripping hand wrist 208, to the distal armband 352 on the user's forearm 206, via the above-noted fulcrum provided by the proximal armband 352. Moreover, the rotational forces and/or torque generated by the powered hand tool 100, also previously transferred to the user's gripping hand wrist 208, are now transferred to the user's forearm 206 via static friction generated between the user's forearm 206 and the proximal and distal armbands 352 and 354. As a result, the proximal armband 352 and distal armband 354 function to generate a frictional force against the forearm 206 that counteracts the rotational force and/or torque generated by the powered hand tool 100 during operation. To further increase the frictional force between the user's forearm 206 and the proximal and distal armbands 352 and 354, a pair of straps (e.g., the straps 370 shown in FIG. 1) may be utilized.

Figure 9:
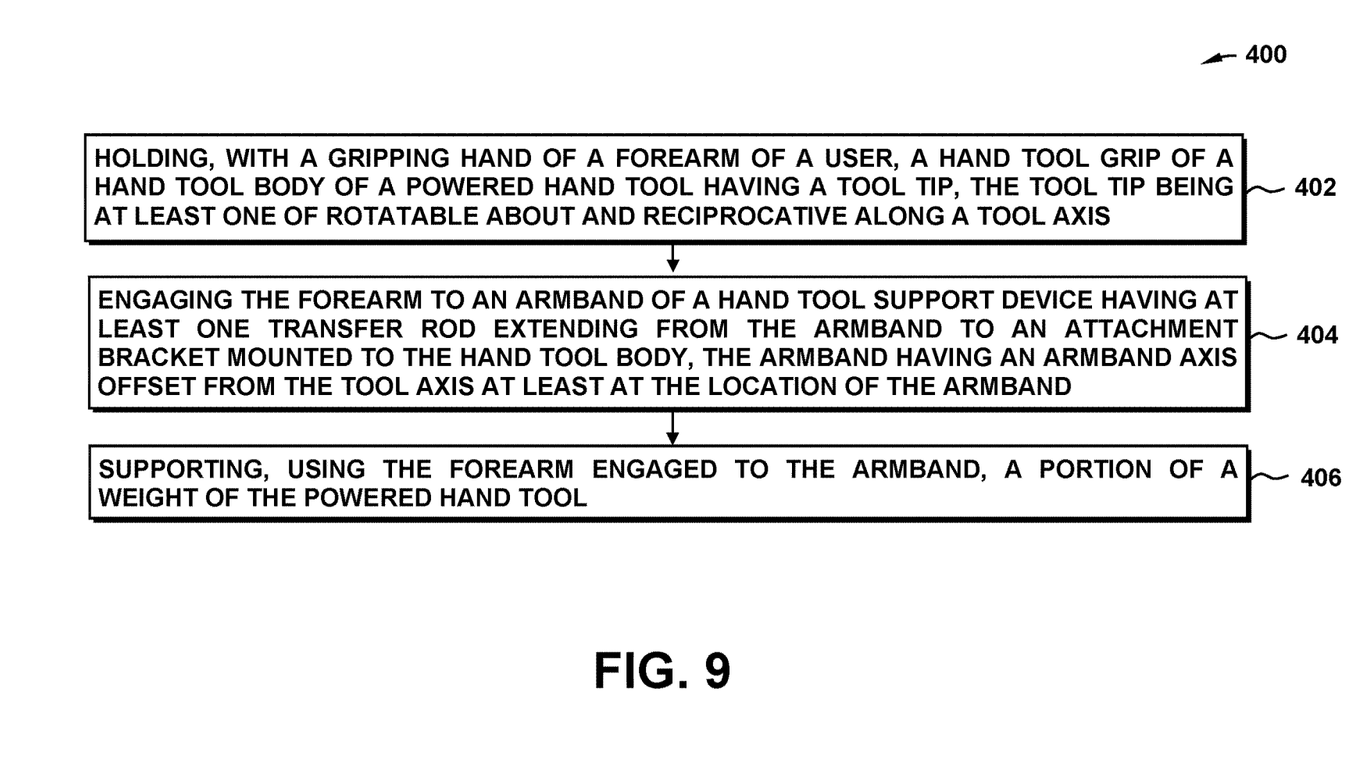
FIG. 9 is a flowchart including one or more operations included in a method of supporting a powered hand tool.

FIG. 9 is a flowchart including one or more operations that may be included in a method 400 of supporting a powered hand tool 100. Step 402 of the method 400 includes holding, with the gripping hand 202 of the forearm 206 of the user 200, the hand tool grip 110 extending outwardly from the hand tool body 106 of the powered hand tool 100. As indicated above, the powered hand tool 100 has a tool bit 114 which may be detachably coupled to the tool forward end 102 of the hand tool body 106. The tool bit 114 is rotatable about and/or reciprocative along the tool axis 118 of the tool bit 114.

The presently-disclosed method may include attaching or clamping the attachment bracket 302 to the hand tool body 106 prior to operating the powered hand tool 100. The attachment bracket 302 may be attached or clamped onto the hand tool body 106 at a location between the hand tool grip 110 and the tool bit 114. However, the attachment bracket 302 may be attached or clamped onto the hand tool body 106 at any location along the length of the hand tool body 106.

The step of attaching the attachment bracket 302 to the hand tool body 106 may include clamping the hand tool body 106 between a first bracket portion 330 and a second bracket portion 332 as shown in FIGS. 1-4. The first bracket portion 330 and the second bracket portion 332 may be fastened together using mechanical fasteners 334. Preferably, the attachment bracket 302 is attached to the hand tool body 106 in a manner preventing rotational movement or axial movement of the attachment bracket 302 relative to the hand tool body 106. As indicated above, the first bracket portion 330 may be comprised of an inner part 340 and an outer part 342 mateable to each other as shown in FIG. 2. The inner part 340 and the outer part 342 may each have semi-cylindrical bore portions 318 formed in the aft end such that when the inner part 340 is clamped to the outer part 342 as shown in FIG. 6, the semi-cylindrical bore portions 318 collectively form the bores 310 for receiving the below-described flexible connectors 380a, 380b to which the transfer rods 374 are attached.

Step 404 of the method 400 includes engaging the forearm 206 to at least one armband 350 of the hand tool support device 300. As described above, the hand tool support device 300 includes at least one transfer rod 374 extending from an armband 350 to the attachment bracket 302. For example, FIGS. 1-4 and 6-8 illustrate a pair of transfer rods 374 arranged in laterally-spaced relation to each other, and extending from the attachment bracket 302 to the proximal armband 352.

The above-described step of engaging the user's forearm 206 to an armband 350 of the hand tool support device 300 may include engaging the forearm 206 to the proximal armband 352 located nearest the attachment bracket 302, and engaging the forearm 206 to the distal armband 354 located furthest from the attachment bracket 302. As indicated above, the proximal armband 352 and the distal armband 354 preferably have an arcuate shape configured to generally conform to the cross-sectional shape or curvature of a user's forearm 206. In the example shown in the figures, the proximal armband 352 and the distal armband 354 may respectively have an open cross section 356a, 356b with respective open sides 366a, 366b, and may include a strap 370 for securing the user's forearm 206 to the proximal armband 352 and/or the distal armband 354. However, in other examples not shown, the proximal armband 352 and/or the distal armband 354 may have a closed cross section requiring the user 200 to insert the forearm 206 axially through the proximal armband 352 and distal armband 354 until the user's gripping hand 202 can grip the hand tool grip 110 of the powered hand tool 100.

For armbands 350 having an open cross section (e.g., 356a, 356b in FIGS. 1, 2, and 7), the method may include securing each armband 350 to the user's forearm 206 using the above-mentioned strap 370. As described above, one or more strap 370 may extend from one or both of the opposing armband ends of an armband 350. The strap 370 may be configured to be tightened in a manner such that the user's forearm 206 is snugly secured against the armbands 350 with little or no play between the forearm 206 and the inner surface 360 of the armband 350. By being secured to the armband 350, the user's forearm 206 can resist torque generated by the powered hand tool 100, such as during an abrupt start or stop of the rotation of a tool bit 114 as may occur, for example, when drilling a hole, installing a fastener, or any one a variety of other operations.

Step 406 of the method 400 includes supporting, using the forearm 206 engaged to one or more armbands 350, a portion of the weight of the powered hand tool 100, which advantageously reduces or minimizes the amount of weight of the powered hand tool 100 supported by the user's gripping hand 202 and wrist 208. Referring to the configuration of the hand tool support device 300 in FIGS. 7-8 in which the open side 366a of the proximal armband 352 and the open side 366b of the distal armband 354 generally face toward each other, the method may include bearing, against the proximal armband 352, the portion of the forearm 206 that is on the same side as the thumb 210 of the gripping hand 202. In addition, the method includes bearing, against the distal armband 354, the portion of the forearm 206 on the side opposite the thumb 210. In this manner, the proximal armband 352 acts as a fulcrum that bears the weight of the powered hand tool 100, and the distal armband 354 resists the rotational force generated by the weight of the powered hand tool 100 acting about the fulcrum, thereby reducing the total amount of weight carried by the user's wrist 208 and gripping hand 202. For the hand tool support device 300 in FIGS. 1-3 in which the open side 366a of the proximal armband 352 and the open side 366b of the distal armband 354 face in the same direction, the straps 370 may secure the user's forearm 206 against the armbands 350, allowing the forearm 206 to support at least some of the weight otherwise carried by the user's wrist 208 and gripping hand 202.

The method may include operating the powered hand tool 100 to cause at least rotation and/or reciprocation of the tool bit 114. For example, the user may operate the activation trigger 122 to activate or deactivate the powered hand tool 100, to respectively start and stop movement of the tool bit 114. The method may further include absorbing, at the flexible connectors 380a, 380b, at least a portion of the torque, vibration, and shock generated by the powered hand tool 100 during operation, and which torque, vibration, and shock is otherwise transmitted to the gripping hand 202 and wrist 208 of the user 200. Further in this regard, the hand tool support device 300 advantageously transfers at least a portion of the torque, vibration, and/or shock to the forearm 206, as described above.

In an embodiment, one or more of the flexible connectors 380a, 380b may be provided as a coil spring, an elastomeric tube, or other flexible connecting mechanism, as described above. To facilitate the flexing of each flexible connector 380a, 380b, a transfer rod 374 may be coupled to the flexible connectors 380a, 380b in a manner such that a gap 382 (e.g., FIG. 6) of between 0.10-1.0 inch exists between a transfer rod 374 and the attachment bracket 302. In an alternative arrangement not shown, a flexible connector (e.g., 380a, 380b) may be mounted to the proximal armband 352 in a manner similar to that which is shown in FIG. 6. In such an arrangement, a gap 382 may be provided between the rod end 376 of the transfer rod 374 and the side edges 358 of the proximal armband 352. In a still further arrangement not shown, a flexible connector 380a, 380b may be installed at any location along the length of the transfer rod 374. For example, the transfer rod 374 may be located approximately midway between the attachment bracket 302 and the proximal armband 352. A gap 382 may be included between the opposing rod ends 376 of the transfer rod segments (not shown). Regardless of the location of the flexible connectors 380a, 380b on the hand tool support device 300, the gap 382 may allow each flexible connector 380a, 380b to flex and stretch, thereby allowing the flexible connectors 380a, 380b to absorb shock and vibration during operation of the powered hand tool 100. In addition, the flexible connectors 380a, 380b may allow the armband 350 to move (e.g., translate and/or/or rotate) slightly relative to the tool powered hand tool 100 during operation of the powered hand tool 100.

As mentioned above, in addition to supporting a portion of the weight of the powered hand tool 100, the armbands 350 advantageously allow the user's forearm 206 to resist at least a portion of the torque generated by the powered hand tool 100 during operation. In this regard, the proximal armband 352 and the distal armband 354 may reduce the amount of torque that is transferred to the user's gripping hand 202 and wrist 208 when the powered hand tool 100 is operated. Furthermore, as indicated above, the proximal armband 352 and/or the distal armband 354 may each have an armband liner 368 formed of a resiliently compressible material lining at least a portion of the inner surface 360 of the armbands 350. The resiliently compressible material may be foam rubber, closed-cell foam, neoprene, or any one a variety of other resiliently compressible materials. The armband liner 368 may reduce or minimize the amount of shock and/or vibration transmitted from the attachment bracket 302, through the transfer rods 374 and into the armbands 350, and ultimately to the user's forearm 206. In this manner, the armband liner 368 provides protection and comfort to the forearm 206 against shock and/or vibration.

The method may additionally include grasping, using the user's guiding hand (not shown), the outer surface 314 of the attachment bracket 302, such as during operation of the powered hand tool 100. The outer surface 314 of the attachment bracket 302 may provide a safe and secure hand hold with which the user 200 can grip and support the powered hand tool 100 during operation. As indicated above, the outer surface 314 may be oriented and contoured complementary to the user's guiding hand to allow the guiding hand to guide and control the tool bit 114 during rotation and/or reciprocation, while the user's gripping hand 202 controls the on-off operation and/or speed of the powered hand tool 100.

The method may additionally include applying, using the user's guiding hand, an axial force to a lip 308 optionally included with the outer surface 314 of the attachment bracket 302. As indicated above, the lip 308 may protrude laterally outwardly from the outer surface 314, as shown in FIGS. 1-3 and 7-8. The lip 308 allow the user's guiding hand to assist in applying axial force to the powered hand tool 100 along a direction parallel to the tool axis 118. For example, when drilling a hole or installing a fastener in a workpiece, the user's guiding hand may work in cooperation with the user's gripping hand 202 to apply axial force on the powered hand tool 100.

The method may additionally include absorbing, during operation of the powered hand tool 100, torque, shock, and vibration using a bracket liner 316 lining at least a portion of the inner surfaces 312 of the attachment bracket 302. As indicated above, the bracket liner 316 may be a compliant, energy-absorbing or resiliently compressible material. For example, the resiliently compressible material may be a foam rubber or other compliant material described above. The bracket liner 316 may advantageously reduce or minimize the amount of vibration, shock, and/or torque that is otherwise transmitted to the guiding hand, gripping hand 202, and forearm 206 of the user 200.

Many modifications and other configurations of the disclosure will come to mind to one skilled in the art, to which this disclosure pertains, having the benefit of the teachings presented in the foregoing descriptions and the associated drawings. The configurations described herein are meant to be illustrative and are not intended to be limiting or exhaustive. Although specific terms are employed herein, they are used in a generic and descriptive sense only and not for purposes of limitation.

What is claimed is:

1. A hand tool support device for a powered hand tool, comprising:
   an attachment bracket configured to be attached to a hand tool body of a powered hand tool having a hand tool grip extending outwardly from the hand tool body, the hand tool grip configured to be held by a user, the hand tool body having a tool bit being at least one of rotatable about and reciprocative along a tool axis, the attachment bracket configured to be coupled to, attached to, or clamped to the hand tool body in a manner such that the attachment bracket surrounds the tool axis;
   at least one armband configured to receive a forearm of the user, the armband having an armband axis;
   at least one transfer rod extending between and coupling the armband to the attachment bracket; and
   a flexible connector included at a lengthwise location of the transfer rod and enabling movement of the armband axis relative to the attachment bracket, and absorbing at least one of torque, vibration, and shock on the gripping hand, wrist, and forearm of the user.

2. The hand tool support device of claim 1, wherein:
   the flexible connector comprises one of a coil spring and an elastomeric tube.

3. The hand tool support device of claim 1, wherein:
   the flexible connector is fixedly mounted to the attachment bracket and extends outwardly therefrom; and
   a rod end of the transfer rod being received in a portion of the flexible connector extending out of the attachment bracket.

4. The hand tool support device of claim 1, wherein:
   the at least one armband comprises a proximal armband located nearest the attachment bracket and a distal armband located furthest from the attachment bracket and axially spaced apart from the proximal armband along the armband axis; and
   the proximal armband and the distal armband interconnected by one or more connecting rods.

5. The hand tool support device of claim 4, wherein:
   the proximal armband has a first open cross section having a first open side;
   the distal armband has a second cross section having a second open side; and
   the first open side of the proximal armband faces in a direction toward the second open side of the distal armband.

6. The hand tool support device of claim 1, wherein:
   the armband has a strap extending from at least one of opposing armband ends and configured to secure the armband to a forearm of the user.

7. The hand tool support device of claim 1, wherein:
   the attachment bracket includes a bracket liner comprising a resiliently compressible material lining at least a portion of an inner surface of the attachment bracket.

8. The hand tool support device of claim 1, wherein:
   the attachment bracket includes an outer surface having a lip protruding laterally outwardly from the outer surface.

9. The hand tool support device of claim 1, wherein:
   the attachment bracket comprises a first bracket portion and a second bracket portion configured to be fastened to each other in a manner such that the hand tool body is clamped therebetween.

10. A hand tool support device for a powered hand tool, comprising:
    an attachment bracket configured to be attached to a hand tool body of a powered hand tool having a hand tool grip extending outwardly from the hand tool body, the hand tool grip configured to be held by a user, the hand tool body having a tool bit being at least one of rotatable about and reciprocative along a tool axis, the attachment bracket configured to be coupled to, attached to, or clamped to the hand tool body in a manner such that the attachment bracket surrounds the tool axis;
    a proximal armband located nearest the attachment bracket and a distal armband located furthest from the attachment bracket, the proximal armband and the distal armband interconnected by one or more connecting rods;
    a pair of transfer rods arranged in laterally-spaced relation to each other and coupling the proximal armband to the attachment bracket; and
    a pair of flexible connectors respectively included with the pair of transfer rods and coupling the transfer rods to the attachment bracket.

11. A method of supporting a powered hand tool, comprising:
    holding, with a gripping hand of a forearm of a user, a hand tool grip of a hand tool body of a powered hand tool having a tool bit at least one of rotatable about and reciprocative along a tool axis of the tool bit;
    engaging the forearm to at least one armband of a hand tool support device having at least one transfer rod extending from the armband to an attachment bracket coupled to, attached to, or clamped to the hand tool body in a manner such that the attachment bracket surrounds the tool axis; and
    supporting, using the forearm engaged to the armband, a portion of a weight of the powered hand tool.

12. The method of claim 11, wherein the hand tool support device includes a flexible connector at a lengthwise location of the transfer rod, the method further including:
    operating the powered hand tool to cause at least one of rotation and reciprocation of the tool bit; and absorbing, at the flexible connector, at least one of torque, vibration, and shock generated during at least one of rotation and reciprocation of the tool bit.

13. The method of claim 11, wherein the step of engaging the forearm to at least one armband comprises:
  engaging the forearm to a proximal armband located nearest the attachment bracket; and
  engaging the forearm to a distal armband located furthest from the attachment bracket and axially spaced apart from the proximal armband along an armband axis, the proximal armband and the distal armband interconnected by one or more connecting rods.

14. The method of claim 13, wherein the steps of engaging the forearm to the proximal armband and the distal armband comprise:
  bearing, against the proximal armband, a side of the forearm on a same side as a thumb of the gripping hand; and
  bearing, against the distal armband, a side of the forearm opposite the thumb.

15. The method of claim 11, wherein the armband has an open cross section, the method including:
  securing the armband to the forearm using a strap.

16. The method of claim 11, further including:
  attaching the attachment bracket to the hand tool body prior to holding the hand tool grip of the powered hand tool and engaging the forearm to the armband of the hand tool support device.

17. The method of claim 16, wherein the step of attaching the attachment bracket to the hand tool body comprises:
  clamping the hand tool body between a first bracket portion and a second bracket portion fastened to each other.

18. The method of claim 11, further including:
  absorbing, during operation of the powered hand tool, at least one of torque, shock, and vibration using a resiliently compressible material lining at least a portion of an inner surface of the attachment bracket in contact with an exterior surface of the hand tool body.

19. The method of claim 11, further including:
  grasping, using a guiding hand of the user, an outer surface of the attachment bracket during operation of the powered hand tool.

20. The method of claim 19, further including:
  applying, using the guiding hand, an axial force onto a lip protruding laterally outwardly from the outer surface of the attachment bracket.

* * * * *